March 13, 1928.  1,662,759
J. R. POLLAN
SEED POTATO CUTTING MACHINE
Filed Oct. 8, 1925    4 Sheets-Sheet 1
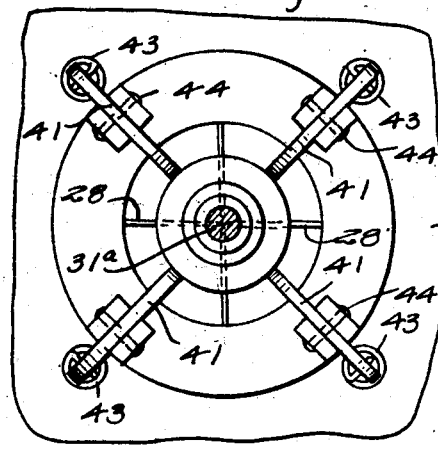
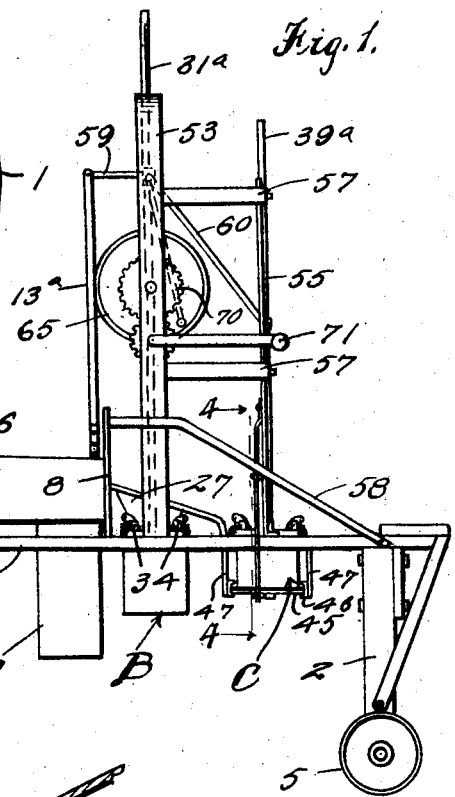
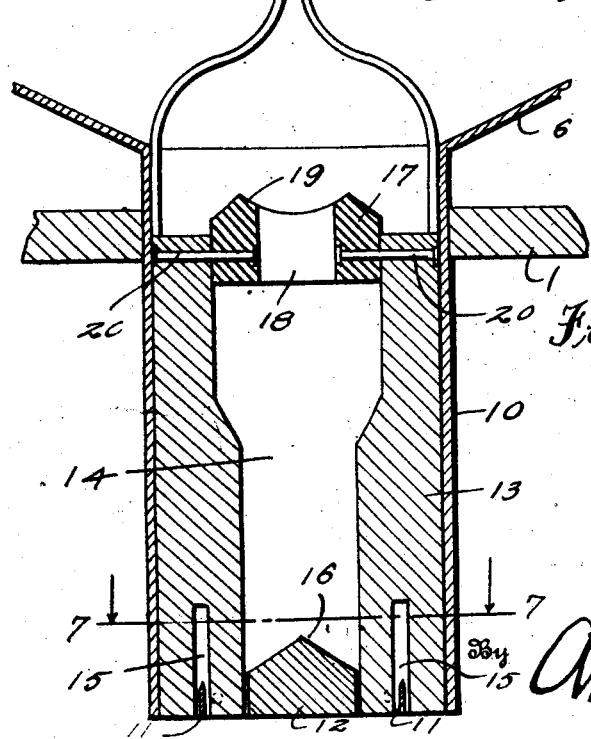
Inventor
J. R. Pollan.

March 13, 1928.
J. R. POLLAN
1,662,759
SEED POTATO CUTTING MACHINE
Filed Oct. 8, 1925
4 Sheets-Sheet 2
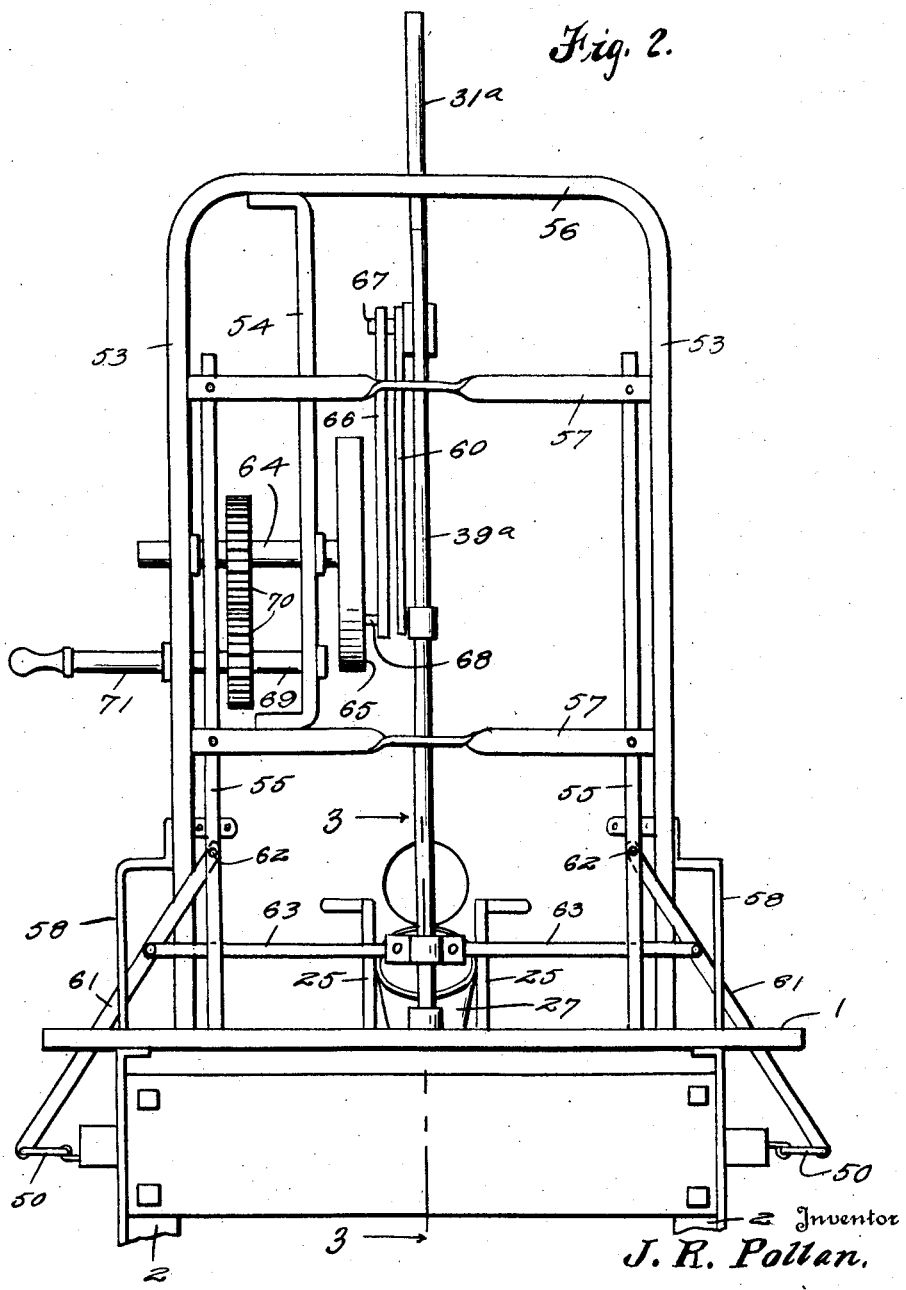

March 13, 1928.
J. R. POLLAN
SEED POTATO CUTTING MACHINE
Filed Oct. 8, 1925
1,662,759
4 Sheets-Sheet 3
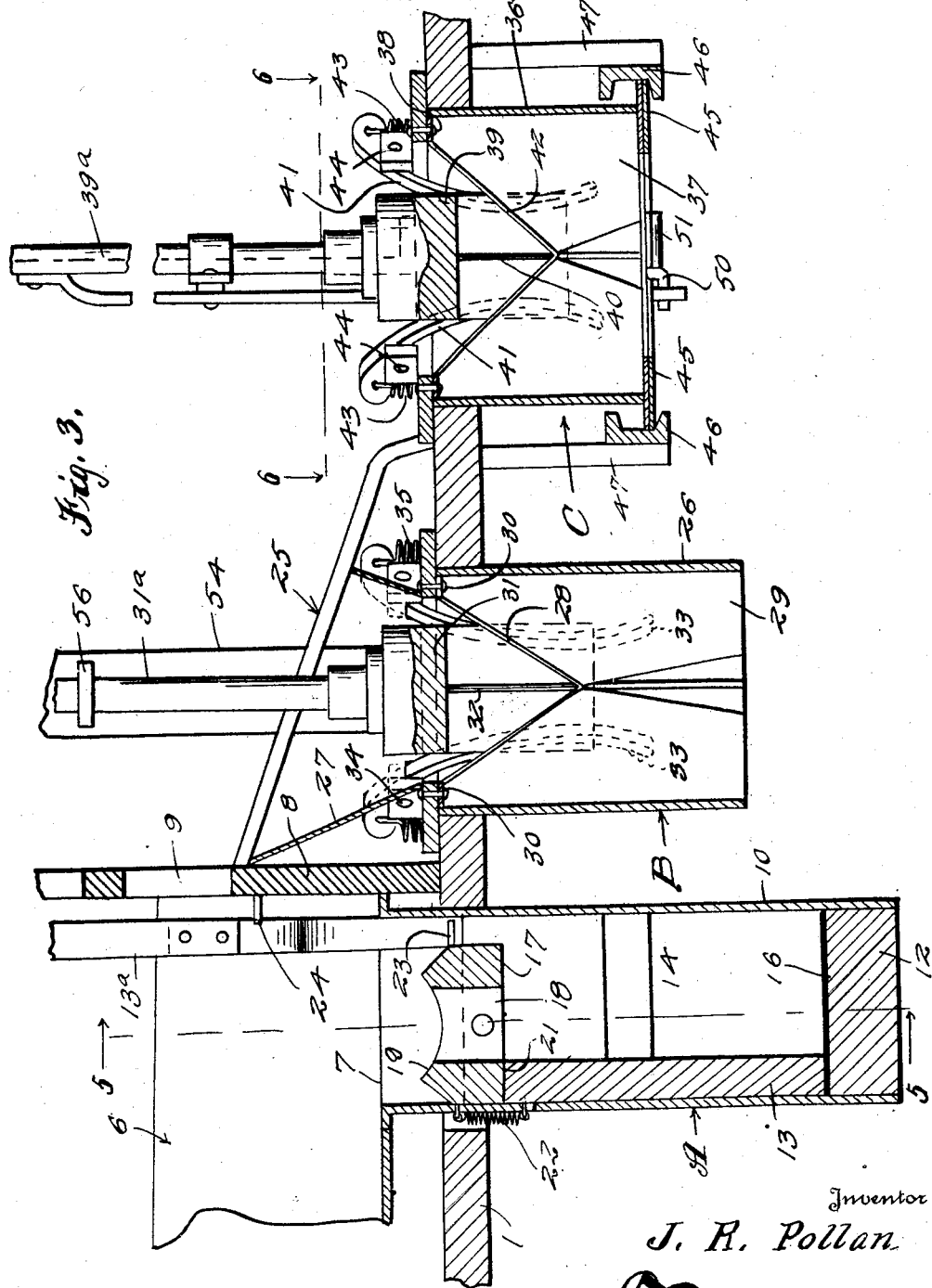
Fig. 3.
Inventor
J. R. Pollan
Attorney March 13, 1928.
J. R. POLLAN
1,662,759
SEED POTATO CUTTING MACHINE
Filed Oct. 8, 1925　　4 Sheets-Sheet 4
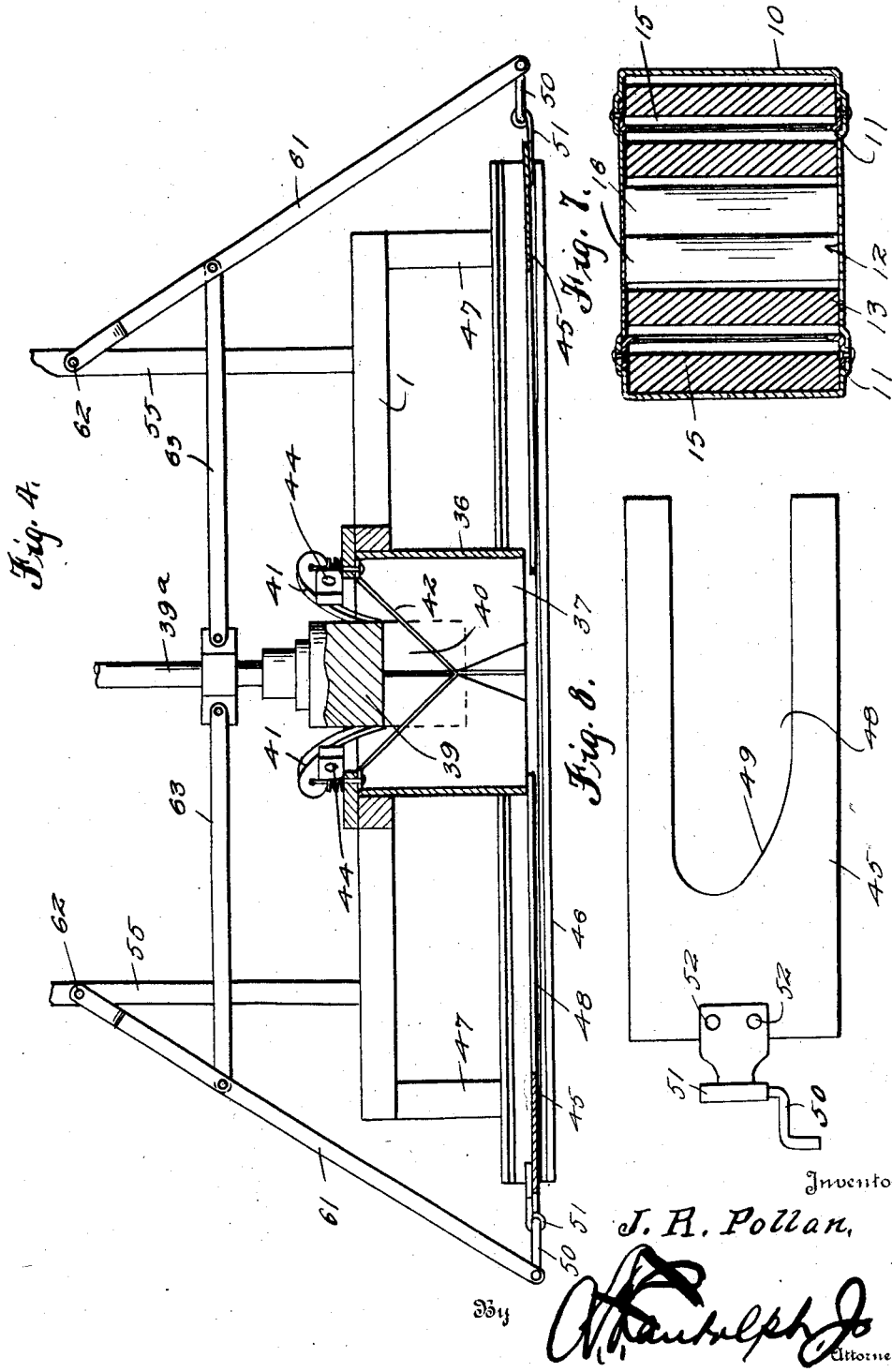
Inventor
J. R. Pollan,
By
Attorney Patented Mar. 13, 1928.

1,662,759

UNITED STATES PATENT OFFICE.

JOHN R. POLLAN, OF FORT SMITH, ARKANSAS.

SEED-POTATO-CUTTING MACHINE.

Application filed October 8, 1925. Serial No. 61,247.

This invention relates to seed potatoe cutting machines, and has for one of its objects the provision of a machine of this character which shall be adapted to cut potatoes of different size into parts of substantially similar size.

A further object of the invention is the provision of a machine of the character stated which shall include means adapted to cut small size potatoes into a certain number of parts, means adapted to cut medium size potatoes into a greater number of parts, means adapted to cut large size potatoes into a still greater number of parts, and means adapted to automatically feed the different size potatoes to their respective cutting means.

A further object of the invention is the provision of a machine of the character stated which shall be simple, durable and inexpensive, which can be operated manually at an expenditure of comparatively little energy or by a hydro-carbon or other motor at small cost, which will not bruise or skin the potatoes, and which can be readily moved from place to place.

The foregoing and other objects are attained by the construction, combination and arrangement of parts hereinafter fully described and claimed, and illustrated in the accompanying drawings, wherein:

Figure 1 is a view in side elevation of the potato cutting machine.

Figure 2 is a view in front elevation of the potato cutting machine,

Figure 3 is a longitudinal sectional view taken on the vertical plane indicated by the line 3—3 of Figure 2, Figure 4 is a transverse sectional view taken on the vertical plane indicated by the line 4—4 of Figure 1, Figure 5 is a detail sectional view taken on the vertical plane indicated by the line 5—5 of Figure 3, Figure 6 is a detail sectional view taken on the horizontal plane indicated by the line 6—6 of Figure 3, Figure 7 is a detail sectional view taken on the horizontal plane indicated by the line 7—7 of Figure 5, and Figure 8 is a detail top plan view of one of the blades of the means for cutting the large size potatoes.

Corresponding and like parts are referred to in the following description and designated in the several views of the accompanying drawings by similar reference characters.

The machine comprises a table 1 which is supported at its front end by legs 2 and at its rear end by legs 3. The table 1 is provided with handles 4, and wheels 5 are journaled on the legs 2, to permit the machine to be readily moved from place to place.

A hopper or trough 6 for the reception of the potatoes to be cut is positioned upon and suitably secured to the table 1. The trough 6 extends longitudinally of the table 1, and is provided in its bottom with a discharge opening 7. The opening 7 is located at the front end of the trough 6, and the sides and bottom of the trough are so inclined as to cause the potatoes to gravitate in the direction of said opening. The front 8 of the trough 6 is vertically arranged and provided with an opening 9 the purpose of which will be presently set forth. A casing 10 extending downwardly from the bottom of the trough 6 and communicating at its upper end with the opening 7 is provided in its lower end with knives 11. These parts extend transversely of the casing 10 and are located at opposite sides of the vertical center thereof. A member 12 is secured within the lower end of the casing 10 between the knives 11. The knives 11 and member 12 extend throughout the entire width of the casing 10, and the member 12 has a greater vertical dimension than the corresponding dimension of the knives 11. The top side of the member 12 inclines downwardly in opposite directions from the longitudinal center thereof and in the direction of the knives 11. A plunger 13 is slidably mounted in the casing 10, and is provided with a vertical passage 14. In its lower end, the plunger 13 is provided with knife receiving grooves 15 and a member receiving groove 16. A cup 17 provided with a vertical passage 18 and a concave top side 19, is rockably supported in the upper end of the plunger 13 by pivots 20. The upper rear side of the plunger 13 is cut away to receive the rear portion of the cup 17 and to provide a shoulder 21 upon which said portion rests when the cup 17 is in horizontal or normal position. The cup 17 is yieldingly retained in normal position by a spring 22 which is secured to the plunger 13 and cup 17 at the rear sides of these parts. The cup 17 is provided at its front side with a pin 23 which is located in the path of a trip carried by and extending rearwardly from the front 8 of the trough 6.

The parts 10, 11, 12 and 13 constitute the means by which the small potatoes are cut up into two pieces each. During the operation of the machine, the plunger 13 is reciprocated vertically, and during the upward movement thereof it passes through the potatoes in the front end of the trough 6. If during this movement of the plunger 13, the cup 17 encounters a potato small enough to pass through the opening 18 thereof, such potato will pass downwardly through the passage 14 and be directed by the inclined top 16 of the member 12 onto one of the knives 11, with the result that during the downward movement of the plunger 13 the potato will be cut into two parts of equal size and the parts discharged from the lower end of the casing 10. Any potato encountered by the cup 17 during the upward movement of the plunger 13, that is too large to pass through the opening 18 of the cup, will rest in the seat 19 and be directed frowardly through the opening 9 when the cup is rocked by reason of the engagement of the pin 23 with the trip 24.

The cup 17 constitutes a grader which permits small size potatoes only to pass into the cutting mechanism just described and generally designated by the letter A and which discharges the medium size and large size potatoes forwardly through the opening 9 onto a grader 25. This grader comprises a pair of relatively spaced and downwardly and forwardly inclined bars, and is adapted to permit the medium size potatoes to fall into a cutting mechanism B, and is adapted to direct the large size potatoes into a cutting mechanism C.

The cutting mechanism B, which is adapted to divide the medium size potatoes up into four equal parts, comprises an open ended and vertically disposed casing 26 which is suitably secured to the table 1 in front of the trough 6 and the cutting mechanism A. A hopper 27 is adapted to convey the medium size potatoes from the grader 25 into the upper end of the casing 26 onto the downwardly and inwardly inclined upper edges 28 of blades 29. These parts are secured within the casing 26 by elements 30, and are vertically disposed and arranged ninety degrees apart. A plunger 31 provided with knife receiving grooves 32 and considerably smaller in diameter than the corresponding dimension of the casing 26, is provided for forcing the potatoes downwardly against the cutting edges 28 of the blades 29. To insure the cutting up of the potatoes into equal parts, guide fingers 33 are provided. These fingers are pivoted at their upper ends as at 34 and extend downwardly into the casing 26 between the blades 29. The fingers 33 are equally spaced, and are of arcuate formation and urged in the direction of each other by springs 35.

The cutting mechanism C to which the large size potatoes are directed by the grader 25, comprises a vertically disposed open ended casing 36 suitably secured to the table 1 in front of the cutting mechanism B, vertically disposed blades 37 supported within the casing 36 by elements 38, a plunger 39 provided with blade receiving grooves 40, and guide fingers 41. The blades 37 are four in number, and are equally spaced and provided with downwardly and inwardly inclined cutting edges 42. The fingers 41 are similar to the fingers 33, have a similar arrangement with respect to the blades 37, and are urged in the direction of each other by springs 43, these fingers being pivotally supported as shown at 44. This cutting mechanism also comprises horizontally disposed blades 45 which are arranged one upon the other and are slidably supported by guides 46 secured to the table 1 by hangers 47. The plunger 39 is adapted during a down stroke to force a potato, supported centrally on the cutting edges 42 of the knives 37 by the fingers 41 downwardly with respect to the knives 37 for a distance sufficient to cut the lower and greater part of the potato into four equal parts. At the end of the down stroke of the plunger 39, the lower half of the potato will extend below the bottom edges of the knives 37, and during the up stroke of the plunger 39 the knives 45 will be operated to cut off said half of the potato. The remaining half of the potato will be discharged from the cutting mechanism during any subsequent down stroke of the plunger 39 when another potato has been fed into the cutting mechanism, and when said remaining portion of the potato is discharged from the mechanism it will be in four equal parts. It will thus be seen that this mechanism cuts the large size potatoes into eight equal parts. The blades 45 are slotted as shown at 48 and provided with arcuate cutting edges 49 adjacent their outer ends. Cranks 50 are journaled in bearings 51 secured as at 52 to the outer ends of the knives 45.

Secured to and extending upwardly from the table 1 is a frame which comprises rear vertical members 53 and 54, front vertical members 55, rear horizontal members 56 and front horizontal members 57. Braces 58 are secured to the table 1, front 8 of the trough 6 and the frame members 53. The plungers 13, 31 and 39 are provided with rods 13$^a$ 31$^a$ and 39$^a$, respectively. The rod 13$^a$ is secured to the rod 31$^a$ by an arm 59, the rod 31$^a$ is slidably mounted in the frame members 56, and the rod 39$^a$ is slidably mounted in the frame members 57. The rod 39$^a$ is connected to the rod 31$^a$ by a link 60.

Levers 61 pivoted at their upper ends as at 62 to the frame members 55 and pivotally connected at their lower ends to the cranks 50, are connected to the rod 39ª by links 63. The connection between the rod 13ª, 31ª and 39ª is such that the plungers 13, 31 and 39 can be simultaneously reciprocated by the application of power to the rod 31ª, and the connection between the rod 39ª and the knives 45 is such that the knives will be moved in the direction of each other to effect the final cutting of the large size potatoes during the up stroke of the plunger 39 and moved in a direction away from each other during the down stroke of the plunger.

The means through the medium of which the plungers 13, 31 and 39 and the knives 45 may be reciprocated, comprises a shaft 64 journaled in one of the frame members 53 and the frame member 54, a counterbalanced fly wheel 65 secured to the shaft 64, a pitman 66 connected as at 67 to the rod 31ª and as at 68 to the fly wheel 65, a shaft 69 journaled in said frame members, meshing gears 70 fixed to the shafts 64 and 69, and a hand crank 71 connected to the shaft 69. If desired a hydro-carbon or other suitable motor may be used in place of the hand crank 71.

From the foregoing description, taken in connection with the accompanying drawings, the advantages of the construction and of the method of operation will be readily apparent to those skilled in the art to which the invention appertains. While I have described the principal of operation of the invention, together with the device which I now consider to be best embodiment thereof, I desire to have it understood that the device shown is merely illustrative, and that such changes may be made when desired as are within the scope of the invention as claimed.

What is claimed is:—

1. A potato cutting machine including a hopper, a cutting mechanism adapted to receive potatoes from said hopper and embodying a knife and a plunger, means carried by the plunger and adapted to permit potatoes of certain sizes only to pass into the cutting mechanism, and plunger operating means.

2. A potato cutting machine comprising a hopper having a discharge opening, a casing communicating with said discharge opening, a blade carried by said casing, a plunger mounted in the casing and provided with a passage through which the potatoes pass from the hopper to a position between the knife and plunger and plunger operating means.

3. A potato cutting machine comprising a hopper provided with a discharge opening, a casing communicating with said discharge opening, relatively spaced knives carried by said casing, a member carried by said casing and located between the knives and provided with oppositely inclined top sides, a plunger mounted in said casing, and provided with a passage through which the potatoes pass from the hopper to said member and plunger operating means.

4. A potato cutting machine comprising a hopper provided with a discharge opening, a casing communicating with said opening, a knife carried by the casing, a hollow plunger carried by said casing, plunger operating means, a cup rockably carried by said plunger and provided with a passage, a trip in the path of the movement of the cup, and another cutting mechanism located beyond the hopper and adapted to have potatoes delivered thereto by said cup when it is tripped.

5. A potato cutting machine comprising a cutting mechanism, a hopper discharging directly into said mechanism, a second cutting mechanism, sorting means forming part of said first cutting mechanism and adapted to permit potatoes of certain sizes only to pass thereto from the hopper and adapted to discharge potatoes of other sizes from the hopper to said second mechanism, and operating means for said mechanisms.

6. A potato cutting machine comprising a cutting mechanism, a hopper discharging directly into said cutting mechanism, a second cutting mechanism located in front of said hopper, a third cutting mechanism located in front of said second cutting mechanism, a sorter adapted to permit potatoes of certain sizes to pass through said second cutting mechanism and to direct potatoes of other sizes to said third cutting mechanism, sorting means forming part of said first cutting mechanism and adapted to permit potatoes of certain sizes only to pass thereto from the hopper and adapted to discharge potatoes of other sizes from the hopper through said first sorter, and operating means for said mechanisms.

In testimony whereof I affix my signature.

JOHN R. POLLAN.